April 15, 1958  D. B. BAKER  2,830,687
PACKAGE BAGGING DEVICE
Filed Sept. 8, 1953
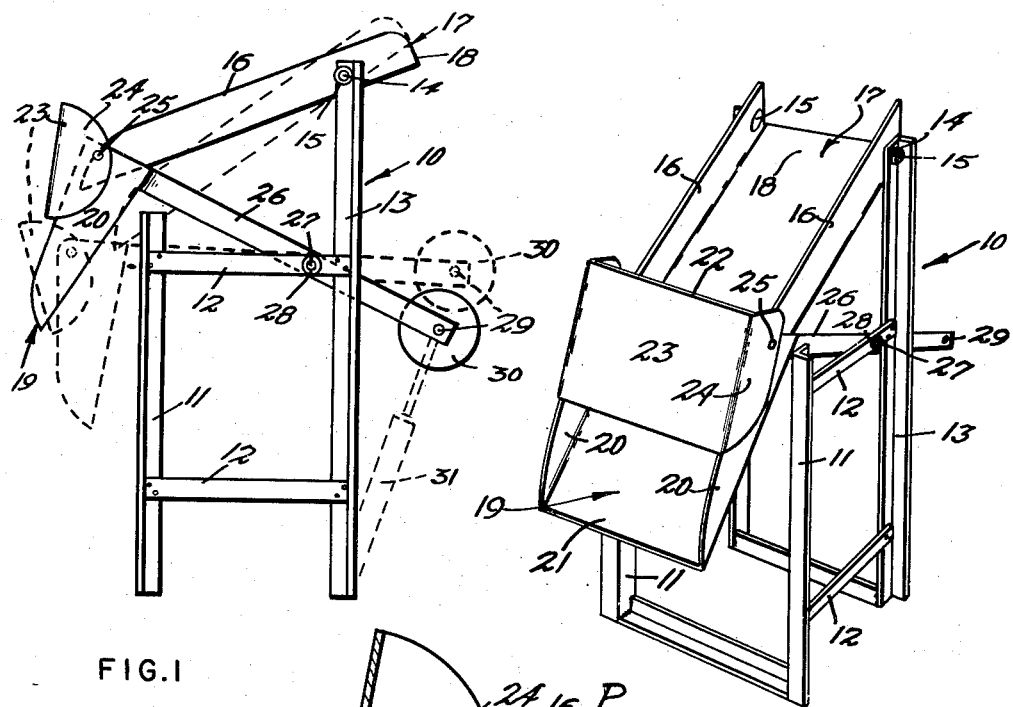
FIG.1
FIG.2
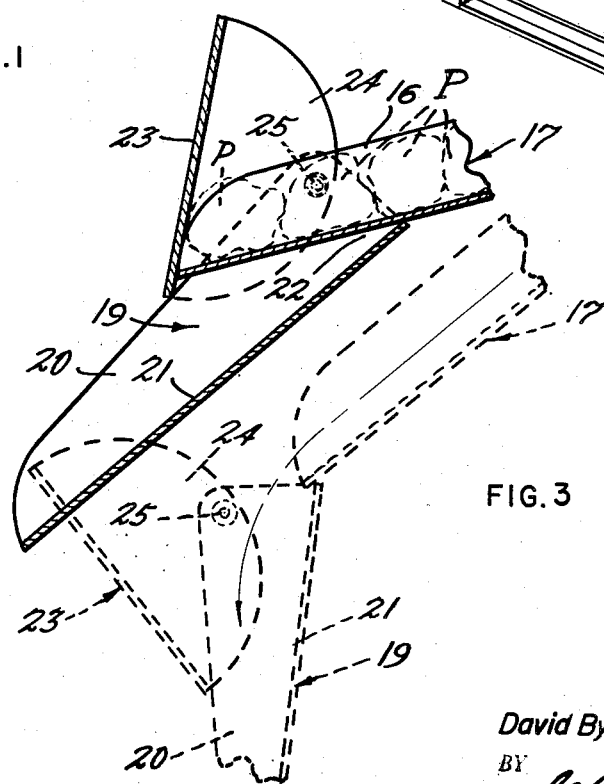
FIG.3
INVENTOR.
David Byron Baker
BY
Glenn L. Fish
his Attorney

United States Patent Office 2,830,687
Patented Apr. 15, 1958

2,830,687

PACKAGE BAGGING DEVICE

David Byron Baker, Kennewick, Wash.

Application September 8, 1953, Serial No. 379,039

2 Claims. (Cl. 193—21)

This invention is a material bagging device.

For convenience in shipping, it is customary to place small packages of bulk material, such as flour and produce, in a larger container or bag, thus reducing the amount of handling necessary while in transit and also, improving the packages for stacking or piling. It is, therefore, one object of the invention to provide a bagging device which is adapted for bagging packages of bulk material.

Another object of the invention lies in the provision of a material bagging device which has a conveying chute communicating with a discharge trough upon which the bag may be held to receive the packages.

Another object of the invention lies in the provision of a material bagging device having a conveying chute tiltable vertically from a position where material will not travel by gravity along the chute to a position where the material will travel along the chute by gravity, enabling the operator to selectively control the amount of material admitted to the bag.

Another object of the invention lies in the provision of a material bagging device having communicating conveying chute and discharge trough and a deflector shield carried by the discharge trough and adapted to guide the material flowing from the conveying chute into the discharge trough when in the lowered position and when the discharge trough is raised, to form a closure for the discharge end of said chute.

These and other objects of the invention will become apparent during the course of the following description.

In the accompanying drawings, forming a part of this specification, and in which like numerals are employed to designate like parts;

Figure 1 is a side elevation of my improved material bagging device;

Figure 2 is a perspective view of the same; and,

Figure 3 is a vertical fragmentary cross section showing in full lines the communicating ends of the conveying chute and discharge trough in the raised or closed position and in the lowered filling position by dotted lines.

Referring now more particularly to the drawings, I have shown the device as having an upright frame, indicated in general by the numeral 10, comprising transversely spaced vertical front legs 11 each secured by means of horizontally extending bracing bars 12 to a vertically disposed back leg 13. The back legs 13 are of greater length than the front legs 11 and have their upper ends terminating a distance above the front legs 11, where they are provided with bearings 14 which carry axially aligned journals 15 having their inner ends supported on the side walls 16 of a conveying chute 17 adjacent the rear receiving end 18 of said conveying chute. The forward or discharge end of the conveying chute 17 is free floating and adapted to be rocked in a vertical plane at right angle to the common axis of the journals 15.

Communicating with the forward discharge end of chute 17 is a discharge trough 19 having side walls 20 spaced apart a greater distance than the side walls 16 of conveying chute 17 and adapted to receive the discharge end of the conveying chute. The side walls 20 are united along their lower edges by a bottom plate 21. The side walls taper in height toward the discharge end of the trough 19. Opposed to the discharge end, trough 19 is provided with a receiving throat 22 which is defined by the bottom wall 21 and a deflector shield 23 spaced above said bottom wall 21 and having right angle flanges 24 disposed in face to face engagement with the outer faces of side walls 20 and pivotally united therewith by means of axially aligned pivot pins 25 extending through said side walls and flanges. It will thus be seen that the deflector shield 23 is tiltable about a horizontal axis in a vertical plane disposed longitudinally of the material bagging device.

The discharge trough 19 is supported by means of spaced rocker arms 26, which have journal pins 27 secured thereto intermediate their lengths and extending at right angles to their axes. These journal pins 27 are carried in bearings 28 supported on upper braces 12 of the frame 10. It will thus be seen that the rocker arms 26 are tiltable about a horizontal axis and in a plane extending longitudinally of the conveying chute 17.

Means for yieldably maintaining the rocker arms with their forward ends in the raised position are provided and are shown to be a horizontally extending transverse shaft 29 upon which is mounted a weight or counter balance 30. The weight or counter balance 30 is sufficient to raise the trough and the floating end of chute 17 when released by the operator. Mechanical means, such as the cylinder indicated by dotted lines at 31, may be provided to hydraulically effect the raising and lowering movements of the trough if desired.

The operation of the invention is as follows:

Packages P of merchandise, or other material, are placed upon the conveying chute 17 from any convenient supply and in any quantity which the conveying chute 17 will contain. When the conveying chute 17 is in the position shown in the full line position of Figure 1, the incline is not great enough so that the packages will slide down the chute by gravity, but in the event some particularly slippery packaging material is used, the deflector shield 23 serves as a closure for the discharge end of the conveying chute 17 to prevent movement of the packages from the conveying chute. The bag in which the packages are to be placed is held with its mouth encircling the lower discharge end of trough 19 and by manual force the discharge trough 19 is lowered, thus permitting the chute 17 to rock vertically and draw the discharge end from the deflector shield 23 thus assuming an angle down which the packaged material will flow by gravity. Movement of the material is guided by deflector sheet 23 into the trough and thence into the bag. Upon release of the trough 19 it will again move by means of counter balance 30 to the raised position, thus stopping the flow of material.

Having thus described my invention, I claim:

1. A package bagging device comprising an upright frame; a package conveying chute pivoted at its rear receiving end to the frame and having its forward discharge end free floating; forwardly extending transversely spaced parallel rocker arms journaled on said frame below said chute and rockable in a vertical plane parallel with the longitudinal dimension of said chute; means yieldably maintaining the rocker arms with their forward ends in the raised position; a package discharge trough fixed on the forward ends of said arms and movable therewith; said trough having an upper receiving throat communicating with the discharge end of said chute; said trough being tapered toward its lower end to be received within the open mouth of a bag in which the packages are to be enclosed; and a deflector shield pivotally united with said trough and extending across its receiving throat in spaced relation to the bottom thereof to direct packages into the trough when the trough is rocked to the lowered position; said deflector being disposed to close the discharge end of the chute when the trough is in the raised position.

2. A bagging device comprising a vertically tiltable chute inclined downwardly from its rear receiving end to its forward discharge end and movable from an incline on which material will advance by gravity to a position on which material will not move by gravity; a vertically shiftable trough having a receiving throat communicating with said chute and adapted to direct material into a bag positioned thereon; a deflector carried by said trough to direct material flowing from said chute into said receiving throat; rocking arms yieldably supporting said trough and having sufficient counterweight to maintain the trough in raised position and wherein the discharge end of the chute is maintained in raised position by being supported upon said trough; and said deflector closing the discharge end of said chute when the trough is in the raised position and movable away therefrom when the trough is lowered.

References Cited in the file of this patent

UNITED STATES PATENTS

| | | |
|---|---|---|
| 707,358 | Sackett | Aug. 19, 1902 |
| 1,111,057 | Coursey | Sept. 22, 1914 |
| 1,438,254 | Moss | Dec. 12, 1922 |
| 1,575,233 | Stillman | Mar. 2, 1926 |
| 1,830,644 | Dietsch | Nov. 3, 1931 |

FOREIGN PATENTS

| | | |
|---|---|---|
| 3,360 | Great Britain | June 2, 1904 |